United States Patent [19]

Coesfeld et al.

[11] Patent Number: 4,658,644
[45] Date of Patent: Apr. 21, 1987

[54] MANOMETER DEVICE FOR CONTINUOUS MONITORING OF THE AIR PRESSURE IN VEHICLE TIRES

[75] Inventors: Dieter Coesfeld, Habichtswalderstr. 15, 3502 Vellmar, Kassel; Bernhard Hugemann, Frankfurt am Main; Ludwig Scondo, Frankfurt am Main; Wilhelm Schuster, Frankfurt am Main; Hans D. Schwabe, Staufenberg; Jürgen Stahl, Frankfurt am Main; Klaus Stösser, Hofheim-Langenhain, all of Fed. Rep. of Germany

[73] Assignee: Dieter Coesfeld, Kassel, Fed. Rep. of Germany

[21] Appl. No.: 779,931

[22] Filed: Sep. 25, 1985

[30] Foreign Application Priority Data

Oct. 5, 1984 [DE] Fed. Rep. of Germany ....... 3436493

[51] Int. Cl.⁴ .......................... G01L 7/08; G01L 9/10
[52] U.S. Cl. .................... 73/146.8; 73/146.5; 73/728; 336/30; 340/58
[58] Field of Search .................. 73/146.8, 146.5, 728, 73/722; 336/30; 340/58

[56] References Cited

U.S. PATENT DOCUMENTS 3,761,958 9/1973 Nishira .................................. 73/728
4,163,208 7/1979 Merz .................................. 73/146.5

FOREIGN PATENT DOCUMENTS 0491056 2/1976 U.S.S.R. ................................ 73/728

Primary Examiner—Donald O. Woodiel
Attorney, Agent, or Firm—Fidelman, Wolffe & Waldron

[57] ABSTRACT

A manometer device for continuous monitoring of the air pressure in vehicle tires is described which consists of a manometric capsule and an electrical indicator device associated therewith. A flatly conical membrane with a cylindrical projection is arranged transversely through the interior space of the manometric capsule. A permanent magnet is inserted in this projection. The membrane divides the interior space of the manometric capsule into two chambers, of which one chamber is stressed with a nominal pressure and the other chamber is connected to the pressure space of a vehicle tire. A stationary sensor, which is associated with the manometric capsule to be mounted on a rim flange, responds to linear magnetic field variations and transmits the latter to a terminal.

7 Claims, 3 Drawing Figures

MANOMETER DEVICE FOR CONTINUOUS MONITORING OF THE AIR PRESSURE IN VEHICLE TIRES

BACKGROUND OF THE INVENTION

The invention relates to a manometer device for continuous monitoring of the air pressure in vehicle tires, wherein a membrane and a magnet movable therewith are inserted in a manometric capsule consisting of a base with a cover attachable fluidtightly thereon, which capsule responds to variations in the air pressure of tires and transmits them to a terminal.

Tire-monitoring appliances in which a magnetc is moved or the magnetic field is modified in another manner by membranes or manometric capsules as a function of the prevailing tire pressure have been proposed in numerous forms of construction.

An alarm system for low tire pressure is known from German Offenlegungsschrift No. 2,556,047, wherein a magnet is provided with a first and second pole surfaces in order to form a closed magnetic flux in the normal position of the magnet. The device exhibits a low-pressure air switch in a chamber system which is provided with a plurality of valves and an air bellows which supplies the reference pressure. The low-pressure air switch is attached to the rim of the vehicle tire and extends into the tire. When the tire pressure falls, a piston sealed by an O-ring is activated, which releases the bellows movement. The magnet is then moved out of the normal position into an extended position. The external magnetic field thereby generated is sensed by a stationary sensing device in order to generate a signal.

A similar monitoring system with magnetic signalling, which is installed in the interior of the rim and therefore in the air space of the vehicle tire, is described in German Offenlegungsschrift No. 2,848,942. It is therefore necessary for the appliance to be installed and adjusted by charging with helium gas before the tire is fitted. This monitoring system also consists of numerous components, such as an expansible bellows and a magnet unit associated therewith with permanent magnet and pole piece, a plate made of ferromagnetic material. The fact that the appliance is no longer accessible after the tire has been fitted is particularly disadvantageous. Furthermore, the magnet is moved in the radial direction toward the vehicle wheel.

A tire pressure gauge with a magnetic transmission device for the measured value of vehicle tires is known from German Offenlegungsschrift No. 3,029,246. This pressure gauge consists of a manometric capsule with a corrugated stainless steel membrane, upon which the prevailing tire pressure acts through a bore in the rim. The corrugated membrane carries a magnet which is moved radially to the wheel as a function of the tire pressure. In addition, a reference magnet is provided which revolves with the rotation of the wheel but which does not execute a radial movement. During each wheel revolution, both magnets are carried past an induction coil and the induced voltages are processed electrically so that they can be compared. Voltage differences which appear indicate a drop in pressure in monitored tires.

All of the manometric systems which have hitherto become known for continuous monitoring of the air pressure in vehicle tires are extremely complicated in construction and consist of a large number of individual components. Furthermore, in the case of the majority of systems, the rim of the vehicle wheel has to be provided with a bore, an undesirable feature from an operational standpoint. Stringent demands are also imposed upon the fluidtightness of the transducer housings because the smallest drop in pressure in the reference chamber can lead to faulty indications. The majority of transducers are equipped with springs and corresponding adjusting screws, and as a result, the temperature sensitivity of such monitoring appliances is very high. This creates the necessity for additional components to compensate for temperature fluctuations. The monitoring systems proposed are described with transducers which are fitted to the rim so that the movement of the elements supporting the magnet occurs radially to the vehicle wheel. Due to this placement on the rim, extremely high centrifugal forces come into play, at least in some cases, which are a function of the rim diameter and of the speed of travel, and therefore, such forces fluctuate a great deal.

OBJECT AND SUMMARY OF THE INVENTION

The aim of the invention is to produce a manometer device of the type initially stated which can be produced from a few individual components in a simple compact construction and which is easy to install on the rim flange of a vehicle tire, while at the same time being adaptable without difficulty to different fields of use with different pressure conditions with reliable performance.

This aim is achieved by a manometer device of the type initially stated in which the membrane consists of a membrane part extending inwards flatly conically from a circular circumferential edge, which exhibits a central aperture and is drawn cylindrically outwards, the bottom of this cylindrical projection being closed. The membrane is inserted so as to bridge the interior space of the manometric capsule and rests with its circumferential edge upon a shoulder directed inwards at the free edge of the base of the manometric capsule and held there firmly and fluid-tightly by the cover screwed onto the base. A permanent magnet is inserted in the cylindrical projection of the membrane, and the cover exhibits a pipe connector connectable to a valve of a vehicle tire. A magneto-resistive sensor cooperating with a terminal is associated with the manometric capsule.

Convenient further developments of the manometer device are characterised in the sub-claims.

The manometric capsule according to the invention with its linear characteristics and linear magnetically sensitive sensor embodying the magnetoresistive effect makes possible a simple circuit arrangement which communicates an indication of the state of the vehicle tire contactlessly across a relatively large interval of more than 2 cm. The manometric capsule can be constructed to very small dimensions and with low weight.

The linear stroke variation of the membrane is a function of the tire pressure. It consists of a material which is sufficiently sensitive to respond to variations relative to a rated pressure or nominal pressure. The manometric capsule can be adapted without difficulty to various fields of use with different pressure conditions. The manometric capsule is divided into two chambers by the membrane. During assembly, one chamber is first of all stressed with the required nominal pressure, then fitted to the rim flange of a vehicle tire and connected to a valve of the tire, and the pressure equilibrium is thereby created in the chambers. The assembly of this handy manometric capsule to the rim flange is extremely simple, and there is the further advantage that this small appliance is accessible from the outside at all times. A permanent magnet of high temperature stability and great coercive field strength and in which no demagnetization occurs. The few components, which can easily be matched to requirements, produce a monitoring device which is reliable during operation and which can be fitted to vehicle tires without difficulty. Obviously, all of the above features of attributes also apply to the sensor which cooperates with the manometric capsule in order to give the desired signal which indicates any variation in the tire pressure.

FIGURE DESCRIPTIONS

The invention will be explained more fully with reference to an example of construction illustrated in the drawings, wherein.

DETAILED DESCRIPTION OF THE INVENTION

Figure 1:
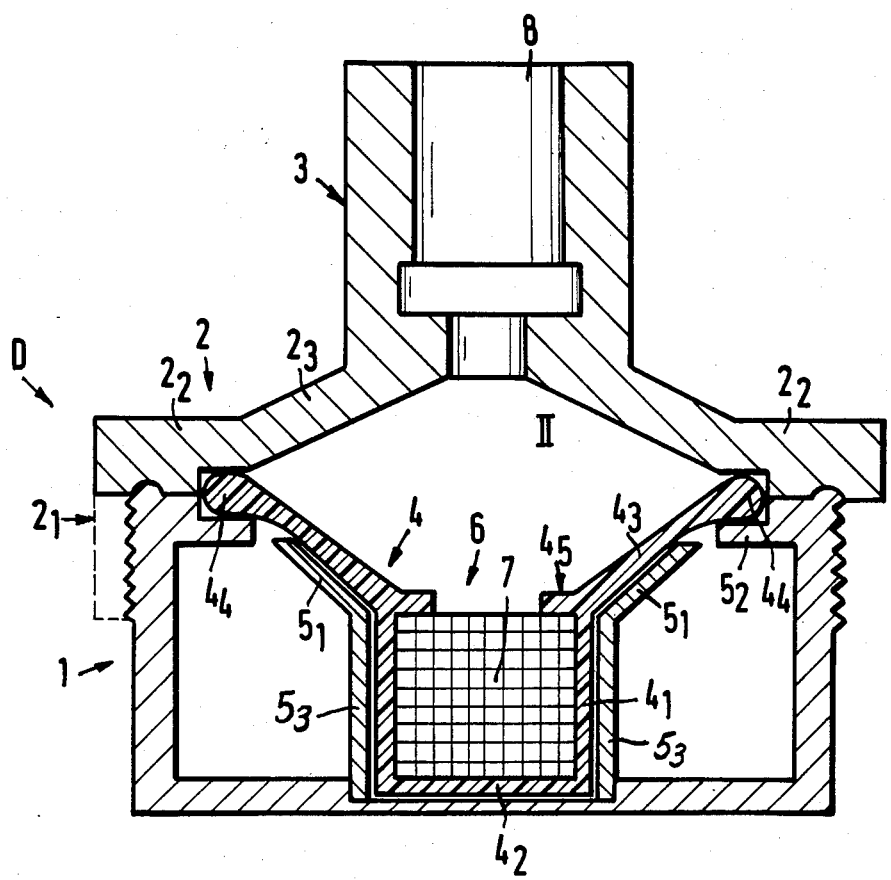
FIG. 1 is a longitudinal sectional view of a manometric capsule in the equilibrium or pressure-less state.

The manometric capsule, generally designated D, consists of a cylindrical base 1 and a cover 2 to be placed fluidtightly thereon with a pipe connector 3 for connection to a valve of a vehicle tire (not shown).

A membrane 4 made of a resiliently yielding material, an elastomer for example, which is inserted into the base 1, permits a pressure equalization between two chambers of the manometric capsule D for long periods of time. The membrane 4 consists of a cylindrical projection $4_1$ with closed bottom $4_2$. A membrane part $4_3$ directed flatly conically outwards and upwards, the circumferential edge $4_4$ of which rests upon a shoulder $5_2$ of the base 1 of the manometric capsule D, starts from the edge of the projection $4_1$ opposite the bottom $4_2$, which delimits an aperture 6. This shoulder $5_2$ is directed radially inwards at the free edge, facing the cover 2, of the base 1. The membrane 4 bridges the interior space of the manometric capsule and is linearly movable. A seat adapted to the shape of the membrane 4 is conveniently provided in the base 1 of the manometric capsule D. This seat is formed by a cylindrical recess 5 to receive the cylindrical membrane projection $4_1$. From the free edge of the boundary of this recess 5, a seat surface $5_1$ for the membrane 4 extends flatly conically upwards to the shoulder $5_2$ of the manometric capsule D. The cylindrical projection $4_1$ of the membrane 4 is inserted loosely into the cylindrical recess 5 in the base of the manometric capsule D, and the flatly conical membrane part $4_3$ is placed loosely upon the seat surface $5_1$.

A permanent magnet 7 is inserted into the cylindrical projection $4_2$ of the membrane 4 and is retained in position there, conveniently by a rim $4_5$ molded integrally on the aperture edge of the cylindrical projection $4_1$ of the magnet 4 and directed radially inwards constricting the aperture 6.

Figure 2:
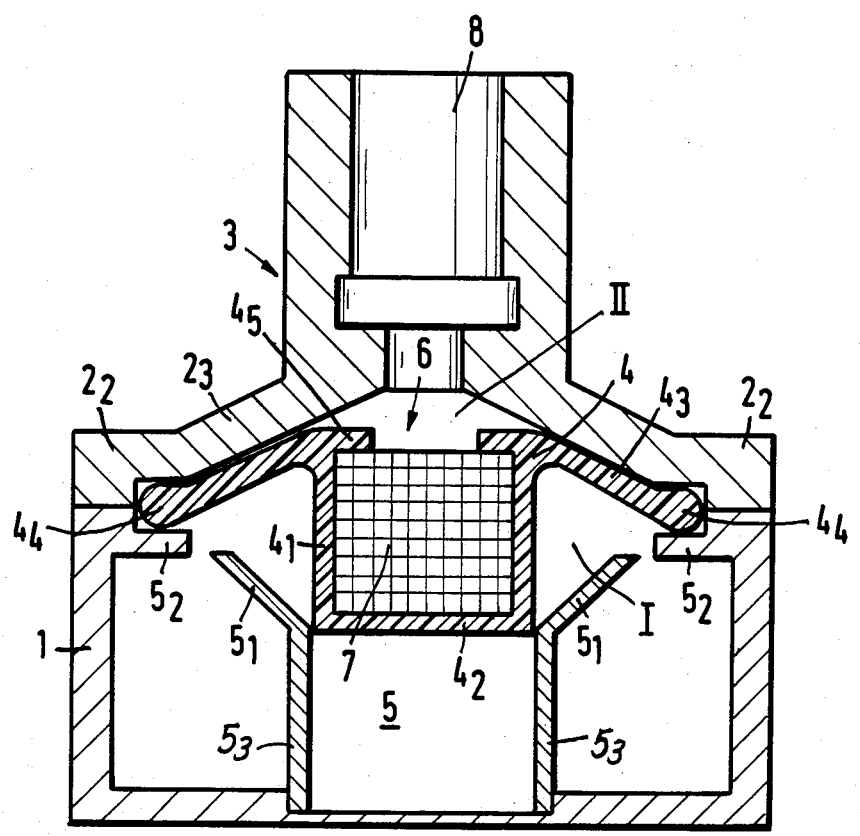
FIG. 2 is a longitudinal sectional view of a manometric capsule with the pressurized chamber remote from the pipe connector.
Figure 3:
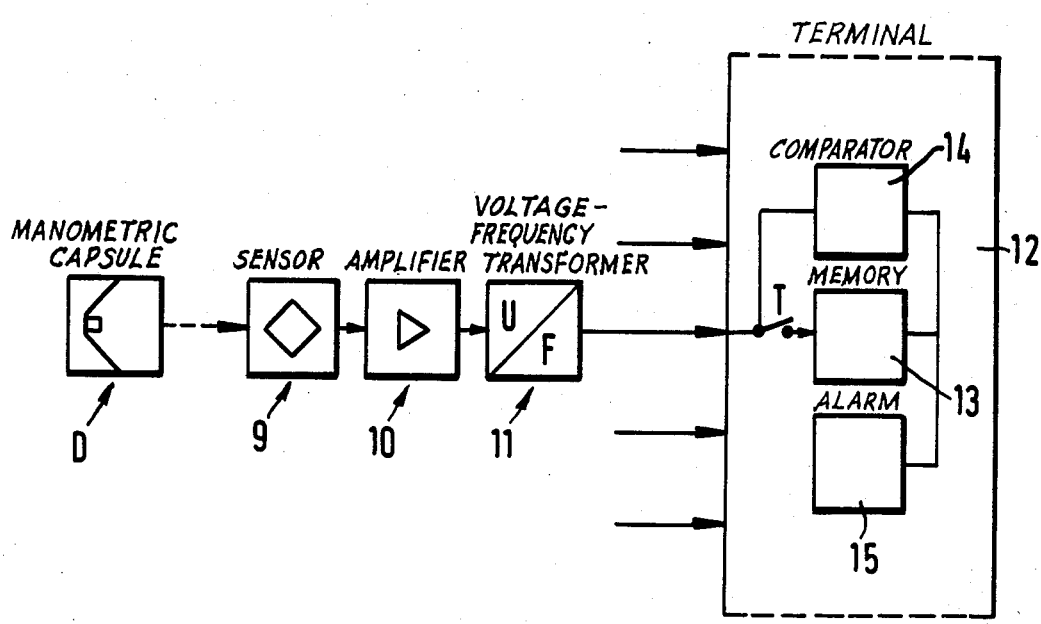
FIG. 3 is a diagrammatic view of sensor devices and indicator devices following the manometric capsule.

The cover 2 of the manometric capsule D is connected fluidtightly to the base 1, and this joint can in fact be made detachably, by screwing for example, or permanently, by welding for example. Provisions for releasable screwing are made in the construction illustrated in FIG. 1. In the case of the construction in FIG. 2 the cover 2 is connected permanently, that is to say nondetachably, to the base 1. The cover 2 of the manometric capsule D engages round the top edge region of the base 1 by a cylindrical ring $2_1$. This cylindrical ring $2_1$ exhibits a female screwthread which is screwed onto a corresponding male screwthread on the base 1. The cover plate consists of a flat ring $2_2$ directed inwards from the circumferential edge of the cylindrical ring $2_1$, which rests its underside upon the top side of the shoulder $5_2$ of the base 1 and upon the circumferential edge $4_4$ of the membrane 4. In this manner the circumferential edge $4_4$ of the membrane 4, which is preferably constructed as a sealing lip, is held fluidtightly between the shoulder $5_2$ of the base 1 and the flat ring $2_2$ of the cover 2. A cover part $2_3$ drawn flatly conically upwards, which is provided with a central aperture which leads into the passage 8 of the pipe connector 3, starts from the edge of the interior aperture of the flat ring $2_2$.

The membrane 4 divides the interior space of the manometric capsule D into two separate chambers, namely into the chamber I in the base 1 and the chamber II in the cover 2. The chamber I is inherently closed, whereas the chamber II can be connected by the passage 8 to the valve of the vehicle tire, so that the pressure existing in the vehicle tire is adjusted in this chamber II.

An electrical device indicating the pressure conditions, which is associated with the manometric capsule D, is arranged stationary at a certain interval, which may be greater than 2 cm, parallel to the orbit of the manometric capsule D attached to the rim flange. This device consists of a sensor 9, which is preferably connected by an amplifier 10 and a voltage-frequency transformer 11 to a terminal 12. This terminal 12 is equipped with corresponding devices which enable the operator to determine instantaneous states of the pressure conditions in the vehicle tire. Thus a memory 13 may be switched on by activating a push-button T. A comparator 14 is connected directly to the voltage-frequency transformer 11 of the indicator device, whilst an alarm device 15 follows this comparator 14.

The function of the monitoring and manometric device is as follows:

The chamber I of the manometric capsule D is stressed with at least the required nominal pressure during production. Because the pressure in the chamber I then rises, the yielding membrane 4 escapes and is lifted from its seat, but held firmly at its circumferential edge $4_4$. The manometric capsule D is then connected by the pipe connector 3 via a tire valve (not shown) to the pressure chamber of the vehicle tire, the yielding membrane 4 first of all assuming an intermediate position because the pressure in the chamber II of the manometric capsule D rises. When the nominal pressure of the connected vehicle tire falls by a specific value, the membrane 4 moves linearly to the pressure into a limit position. Because the membrane 4 admits a pressure equalization between the two chambers I and II over long periods of time, the corresponding pressure will always prevail in the chamber I stressed by the reference pressure. Brief pressure variations in chamber II would scarcely result in a pressure equalization. However, if a major pressure drop occurs in the vehicle tire, the membrane 4 and the magnet 7 integrated therein will be moved into the chamber II, therefore farther away from the stationary magnetoresistive sensor 9.

The latter responds to the linear magnetic field variation which is a function of the stroke of the magnet 4, and a signal amplified by the amplifier circuit is stored in the terminal 12, where the evaluation occurs.

In the case of a pressure equalization in chamber I and chamber II of the manometric capsule D, the signal transmitted is stored in the memory 13. This reference value is then compared with values occurring by pressure variations in the vehicle tire. The circuit of the indicator device may be designed in various ways. For instance, the electrical quantity which varies in the case of a pressure drop in the chamber II may be indicated continuously in order to trip an alarm when a maximum admissible deviation is attained.

The electrical signal is recorded by the magnetoresistive sensor 9 at each passage of the magnet 4 inserted in the manometric capsule D and passed on to the terminal 12. The signal value is independent of the frequency, and therefore it is independent of the speed of rotation of the vehicle tire. Naturally, neither a detection of measured values nor a processing of measured values occurs during standstill of the tire.

A voltage-frequency transformer 11 following the amplifier 10 ensures trouble-free transmission of the electrical signal to the terminal 12 irrespective of the length of the lines or of the number of interposed plug and socket connections. In order to prevent an influence by electromagnetic disturbances, for example, from the ambient field, the frequencies which occur are enquired several times, compared mutually, and stored in the terminal, enumerated, compared with the reference value and indicated only for a plurality of consistent measured values.

In the case of a plurality of tires to be monitored, a microprocessor is conveniently employed in the terminal.

Adequate and reliable monitoring is ensured when the terminal is equipped for the following functions:

determination of the individual points of measurement and storing them with association during the calibration process;

determination of the individual points of measurement in a regularly recurring cycle and comparing the measured values with the stored values;

indicating if the pressure in one of the vehicle tires falls below or rises above a preadjusted value in an axial diagram with alarm signal.

The compact monometric capsule of the present invention, which consists of only a few components and which is relatively easy to install, and the indication circuit associated therewith provide instantaneous readings in air pressure variations in vehicle tires with reliable consistent performance and therefore helps in preventing damage and accidents.

LIST OF REFERENCE NUMERALS

D: Manometric capsule
1: Cylindrical base
2: Cover
$2_1$: Cylindrical ring
$2_2$: Flat ring
$2_3$: Flatly conical cover part
3: Pipe connector
4: Membrane
$4_1$: Cylindrical membrane projection
$4_2$: Bottom
$4_3$: Flatly conical membrane part
$4_4$: Circumferential edge, sealing lip
$4_5$: Rim
5: Recess
$5_1$: Seat surface
$5_2$: Shoulder
6 Aperture
7: Permanent magnet
8: Passage
9: Sensor
10: Amplifier
11: Voltage-frequency transformer
12: Terminal
13: Memory
14: Comparator
15: Alarm device
I: Chamber
II: Chamber
T: Push-button.

We claim:

1. A manometer device for continuous monitoring of air pressure in vehicle tires, wherein a membrane and a magnet movable therewith are inserted in a manometric capsule consisting of a base and a cover attachable fluid-tightly thereon, wherein:

said capsule responds to variations in air pressure in said vehicle tires and transmits a signal to a terminal;

said membrane (4) comprises a membrane part ($4_3$) which extends inwardly in a conical configuration from a circular circumferential edge ($4_4$) to a central aperture (6);

said membrane (4) further comprises a membrane part ($4_1$) which extends in a cylindrical configuration from said membrane part ($4_3$) near, but not at, the periphery of said central aperture (6) to a closed bottom ($4_2$) such that said membrane part ($4_1$) constitutes a cylindrical projection;

said membrane (4) is inserted so as to bridge the interior space of the manometric capsule (D) and rest with its circumferential edge ($4_4$) upon a shoulder ($5_2$) directed radially inwards at the free edge of the base (1) of the manometric capsule (D), and held firmly and fluid-tightly thereon by the cover (2) placed on the base;

a permanent magnet (7) is inserted in the cylindrical projection ($4_1$) of the membrane (4);

said cover (2) comprises a pipe connector (3) connectable to a valve of a vehicle tire; and a magneto resistive sensor (9) co-operating with a terminal (12) is associated with the manometric capsule.

2. A manometer device as claimed in claim 1, wherein the circumferential edge ($4_4$) of the membrane (4) is constructed as a beadlike sealing tip.

3. A manometer device as claimed in claim 1, wherein a seat substantially adapted to the shape of the membrane (4), upon which the membrane (4) rests loosely, is provided in the base (1) of the manometric capsule (D).

4. A manometer device as claimed in claim 1 or 3, wherein a cylindrical recess (5) to receive the cylindrical projection ($4_1$) and a seat surface ($5_1$) which extends outwardly in a conical configuration from the top peripheral edge of the walls ($5_3$) of said cylindrical recess (5) towards, but not to, the shoulder ($5_2$) of the base (1), upon which the membrane (4) rests are provided in the base (1) of the manometric capsule (D).

5. A manometer device as claimed in claim 1, wherein the edge region of the cover (2) is constructed as a flat ring ($2_2$) which rests upon the shoulder ($5_2$) of the base (1) and upon the circumferential edge (4₄), forming the sealing lip, of the membrane (4), and a cover part (2₃) drawn flatly conically upwards, which exhibits a central aperture which leads into a passage (8) of the pipe connector (3), starts from the interior edge of the flat ring (2₂).

6. A manometer device as claimed in claim 1 or 5, wherein the cover (2) exhibits a cylindrical ring (2₁) provided with a female screwthread embracing the base (1) of the manometric capsule (D) and the flat ring (2₂) is directed radially inwards at a right angle from the circumferential edge of the cylindrical ring (2₁) opposite the free edge.

7. A manometer device as claimed in claim 1, wherein an amplifier (10) and a voltage-frequency transformer (11) are associated with the magnetoresistive sensor (9).

* * * * *